United States Patent
Jones et al.

(10) Patent No.: US 11,718,075 B2
(45) Date of Patent: Aug. 8, 2023

(54) HIGH CLARITY, RECYCLABLE, POLYETHYLENE-BASED PACKAGING FILMS

(71) Applicant: ProAmpac Holdings Inc., Cincinnati, OH (US)

(72) Inventors: Alexander David Jones, Newport, KY (US); Amir Saffar, Montreal (CA); Patrick Allen Batten, New London, WI (US); Louann Susan Mueller, Kaukauna, WI (US); Kylie Noel Diges, Appleton, WI (US); Seyed Hesamoddin Tabatabaei, Mason, OH (US)

(73) Assignee: ProAmpac Holdings Inc., Cincinnati, OH (US)

( * ) Notice: Subject to any disclaimer, the term of this patent is extended or adjusted under 35 U.S.C. 154(b) by 0 days.

(21) Appl. No.: 17/384,175

(22) Filed: Jul. 23, 2021

(65) Prior Publication Data
US 2022/0024191 A1    Jan. 27, 2022

Related U.S. Application Data

(60) Provisional application No. 63/056,342, filed on Jul. 24, 2020.

(51) Int. Cl.
*B32B 27/08* (2006.01)
*B32B 27/32* (2006.01)
(Continued)

(52) U.S. Cl.
CPC ............ *B32B 27/08* (2013.01); *B32B 27/306* (2013.01); *B32B 27/32* (2013.01); *B32B 27/34* (2013.01);
(Continued)

(58) Field of Classification Search
CPC ....... B32B 27/08; B32B 27/306; B32B 27/32; B32B 27/34; B32B 2250/03;
(Continued)

(56) References Cited

U.S. PATENT DOCUMENTS

| | | |
|---|---|---|
| 4,623,594 A | 11/1986 | Keough |
| 5,945,183 A | 8/1999 | Johnson |

(Continued)

FOREIGN PATENT DOCUMENTS

| | | |
|---|---|---|
| EP | 3785895 A1 | 3/2021 |
| WO | 2008094085 A1 | 8/2008 |

(Continued)

OTHER PUBLICATIONS

Dawidowicz et al., "Effect of food packaging material on some physicochemical properties of polyacrylate varnish layers," Food Packaging and Shelf Life, vol. 21 pp. 1-8 (Jul. 25, 2019).

(Continued)

*Primary Examiner* — John D Freeman
(74) *Attorney, Agent, or Firm* — McLane Middleton, Professional Association

(57) ABSTRACT

A recyclable packaging film comprising a coextruded web having a high degree of optical clarity and a high level of moisture barrier. The coextruded web comprises a skin layer comprising polyethylene having a high degree of optical clarity and a heat sealant layer which forms an innermost layer of the packaging film, the heat sealant layer comprising a polyolefin polymer. The coextruded web also includes a moisture barrier layer which is disposed intermediate the skin layer and the heat sealant layer. An energy-cured coating is disposed on the skin layer of the coextruded web, wherein the energy-cured coating has a coating weight which is effective to impart a property in the packaging film (Continued)

selected from reduced susceptibility to melting, reduced susceptibility to stretching, or both.

28 Claims, 1 Drawing Sheet

(51) Int. Cl.
  *B65D 65/40* (2006.01)
  *B32B 27/30* (2006.01)
  *B32B 27/34* (2006.01)
  *B65D 65/42* (2006.01)
(52) U.S. Cl.
  CPC .............. *B65D 65/40* (2013.01); *B65D 65/42* (2013.01); *B32B 2250/03* (2013.01); *B32B 2250/05* (2013.01); *B32B 2250/242* (2013.01); *B32B 2255/10* (2013.01); *B32B 2255/26* (2013.01); *B32B 2307/31* (2013.01); *B32B 2307/412* (2013.01); *B32B 2307/414* (2013.01); *B32B 2307/7244* (2013.01); *B32B 2307/7246* (2013.01); *B32B 2553/00* (2013.01)
(58) Field of Classification Search
  CPC .......... B32B 2250/05; B32B 2250/242; B32B 2255/10; B32B 2255/26; B32B 2307/31; B32B 2307/412; B32B 2307/414; B32B 2307/7244; B32B 2307/7246; B32B 2553/00; B32B 2307/306; B32B 2307/558; B32B 2307/7242; B32B 7/12; B32B 2250/24; B65D 65/40; B65D 65/42
  See application file for complete search history.

(56) References Cited

U.S. PATENT DOCUMENTS

| | | | |
|---|---|---|---|
| 6,743,492 B2 | 6/2004 | Bray et al. | |
| 7,063,882 B2 | 6/2006 | Mossbrook et al. | |
| 7,147,923 B2 | 12/2006 | Roberts et al. | |
| 8,551,588 B2 | 10/2013 | Daffner et al. | |
| 10,465,053 B2 | 11/2019 | Breed et al. | |
| 10,751,979 B2 | 8/2020 | Grefenstein et al. | |
| 2004/0180226 A1 | 9/2004 | Chatterjee et al. | |
| 2007/0116910 A1 | 5/2007 | Polykarpov et al. | |
| 2007/0292567 A1 | 12/2007 | Kaas et al. | |
| 2008/0004411 A1 | 1/2008 | Sukhadia et al. | |
| 2009/0220717 A1 | 9/2009 | Wilczak et al. | |
| 2013/0164551 A1 | 6/2013 | Daum | |
| 2016/0023443 A1 | 1/2016 | Klepsch | |
| 2017/0113444 A1 | 4/2017 | Harlow et al. | |
| 2018/0079188 A1 | 3/2018 | Grefenstein et al. | |
| 2018/0354241 A1 | 12/2018 | Gilbert | |
| 2019/0091980 A1 | 3/2019 | Furuya et al. | |
| 2019/0218354 A1 | 7/2019 | Casarrubias et al. | |
| 2019/0224952 A1 | 7/2019 | Clare | |
| 2019/0270856 A1 | 9/2019 | Varadarajan et al. | |
| 2019/0299574 A1 | 10/2019 | Ackermans et al. | |
| 2020/0061984 A1 | 2/2020 | Mishra et al. | |
| 2020/0122439 A1 | 4/2020 | Grefenstein et al. | |
| 2020/0238674 A1 | 7/2020 | Sehanobish et al. | |
| 2020/0324513 A1 | 10/2020 | Tian et al. | |
| 2020/0324526 A1 | 10/2020 | Berbert et al. | |
| 2020/0346446 A1 | 11/2020 | Kelly | |
| 2020/0368991 A1 | 11/2020 | De Schoenmaker et al. | |
| 2020/0391489 A1 | 12/2020 | Lamtigui et al. | |
| 2021/0023828 A1 | 1/2021 | Yamada et al. | |
| 2021/0114358 A1 | 4/2021 | Paduan et al. | |
| 2021/0339925 A1* | 11/2021 | Berbert | B32B 27/32 |
| 2022/0001660 A1* | 1/2022 | Rangwalla | B32B 38/0008 |

FOREIGN PATENT DOCUMENTS

| | | |
|---|---|---|
| WO | 2016100277 A1 | 6/2016 |
| WO | 2019035907 A1 | 2/2019 |
| WO | 2020020544 A1 | 1/2020 |
| WO | 2000016975 A1 | 3/2020 |
| WO | 2020074688 A1 | 4/2020 |
| WO | 2020112148 A1 | 6/2020 |
| WO | 2020131105 A1 | 6/2020 |
| WO | 2020136674 A1 | 7/2020 |
| WO | 2020190507 A1 | 9/2020 |
| WO | 2021011213 A1 | 1/2021 |

OTHER PUBLICATIONS

Deshmukh et al., "Modification of polyethylene surface using plasma polymerization of silane," Journal of Applied Polymer Science, vol. 106, pp. 4075-4082 (Sep. 5, 2007).

Anukiruthika et al., "Multilayer packaging: Advances in preparation techniques and emerging food applications," Comprehensive Reviews in Food Science and Food Safety, vol. 19, pp. 1156-1186 (Apr. 20, 2020).

Butler et al., "PE-Based Multilayer Film Structures," Multilayer Flexible Packaging, Second Edition, pp. 281-310 (Apr. 1, 2016).

Formax, "Printing Lingo: What is a Reverse?" Feb. 11, 2018 retrieved from <http://web.archive.org/web/20180211010802/https://www.forrnaxprinting.com/blog/2010/09/printing-lingo-what-is-a-reverse>.

Machine Translation of WO2020020544A1.

International Search Report and Written Opinion dated Nov. 15, 2021 received in PCT/US2021/043001.

* cited by examiner

HIGH CLARITY, RECYCLABLE, POLYETHYLENE-BASED PACKAGING FILMS

CROSS REFERENCE TO RELATED APPLICATION

This application claims the priority benefit of U.S. provisional application Ser. No. 63/056,342 filed Jul. 24, 2020. The aforementioned application is incorporated herein by reference in its entirety.

BACKGROUND

The present disclosure relates to a recyclable, coextruded monoweb film with high optical clarity and exhibiting high heat resistance characteristics. The packaging films in accordance with this disclosure may advantageously be adapted to provide recyclable polyolefin-based packaging films, and preferably, recyclable polyethylene-based packaging films.

The packaging films disclosed herein may advantageously be formed into packaging articles, such as pouches, bags, overwraps, and the like, that protect consumable products from spoiling or prematurely degrading in various environments throughout the distribution and point of sale channels. Such packaging structures may be used for packaging of food items, liquids, chemicals, health and beauty products, pharmaceutical products, or other consumable product that needs to be protected from oxygen and moisture throughout the distribution channel environment.

In certain packaging applications, it is desirable that the packaging film have a high degree of optical transparency or clarity. The transparency of a polymer film is inversely related to the total haze, including surface haze and internal haze, of the polymer film. For example, in some instances it may be desirable to provide a film having a high degree of optical clarity to allow consumers to visualize clearly the packaging contents through the packaging film.

Certain polyester-based films, e.g., polyethylene terephthalate (PET) based films, are known to provide good clarity and stiffness characteristics. However, one drawback of these films is that they are generally not recyclable in polyethylene or polyolefin recycle streams. Polyethylene resins exhibiting high optical clarity are known, however, such resins lack the resistance to mechanical forces and heat energy required to run on high speed packaging lines without premature melting or deforming. Prior attempts to produce polyethylene-based or polyolefin-based packaging films have utilized grades of polyethylene that are sufficiently resistant to mechanical forces and thermal energy when run on a packaging line, but unfortunately, such packaging films exhibit a relatively high degree of haze and lack of optical clarity. The present development overcomes these limitations by providing a recyclable polyolefin-based packaging film that has an optical clarity that is comparable to transparent polyester-based films while also having a relatively high degree of heat resistance which allows it to be run on a high-speed packaging line without premature melting, stretching, or deforming.

SUMMARY

The present disclosure relates to a recyclable packaging film comprising a coextruded web having a high degree of optical clarity and a high level of moisture barrier. The coextruded web comprises a skin layer comprising polyethylene having a high degree of optical clarity and a heat sealant layer which forms an innermost layer of the packaging film, the heat sealant layer comprising a polyolefin polymer. The coextruded web also includes a moisture barrier layer which is disposed intermediate the skin layer and the heat sealant layer. An energy-cured coating is disposed on the skin layer of the coextruded web, wherein the energy-cured coating has a coating weight which is effective to impart a property in the packaging film selected from reduced susceptibility to melting, reduced susceptibility to stretching, or both.

In one aspect, the packaging film has a haze value in the range of 18% to 30%.

In more limited aspect, the packaging film has a moisture vapor transmission rate in the range of about 1.55 g*25.4 $\mu/m^2/day$ to 7.75 g*25.4 $\mu/m^2/day$.

In another more limited aspect, a printed ink layer is disposed intermediate the skin layer and the energy-cured coating layer.

In another more limited aspect, the heat sealant layer is formed of a polyethylene polymer.

In another more limited aspect, the moisture barrier layer is a high-density polyethylene.

In another more limited aspect, the high-density polyethylene has a density in the range of about 0.940 $g/cm^3$ to 0.975 $g/cm^3$.

In another more limited aspect, the energy-cured coating is a cured polyacrylate composition.

In another more limited aspect, the energy-cured coating is an electron beam cured polyacrylate composition.

In another more limited aspect, the energy-cured coating comprises monomers and oligomers induced into UV polymerization and curing through the mediation of photoinitiators and exposure to UV light.

In another more limited aspect, the packaging film has a haze value in the range of 20% to 28%.

In another more limited aspect, the packaging film has a haze value in the range of 21% to 27%.

In another more limited aspect, a melting temperature of the outermost surface of the packaging film is at least 100 degrees Celsius higher than a melting temperature of the innermost layer of the packaging film In another more limited aspect, a melting temperature of the outermost surface of the packaging film is at least 180 degrees Celsius higher than a melting temperature of the innermost layer of the packaging film.

In another aspect, a polyolefin-based packaging film comprises a coextruded web having a high degree of optical clarity and a high level of moisture barrier. The coextruded web, in turn, comprises a skin layer, a gas barrier layer, a first moisture barrier layer, a second moisture barrier layer, and a heat sealant layer. The skin layer comprises an optically transparent polyethylene polymer. The heat sealant layer forms an innermost layer of the packaging film and comprises a polyolefin polymer. The gas barrier layer is disposed intermediate the skin layer and the heat sealant layer. The first moisture barrier layer is interposed between the skin layer and the gas barrier layer. The second moisture barrier layer is interposed between the gas barrier layer and the heat sealant layer. An energy-cured coating is disposed on the skin layer of the coextruded web and forms an outermost surface of the packaging film. The energy-cured coating has a coating weight which is effective to impart a property in the packaging film selected from reduced susceptibility to melting, reduced susceptibility to deforming, or both.

In one aspect, the packaging film further comprises one or both of a first tie layer disposed between the gas barrier layer and the first moisture barrier layer and a second tie layer disposed between the gas barrier layer and the moisture barrier layer, wherein the first tie layer and the second tie layer may be the same or different.

In a more limited aspect, the packaging film has a haze value in the range of 18% to 30%.

In a more limited aspect, the packaging film has a moisture vapor transmission rate in the range of about 1.55 g*25.4 µ/m²/day to 7.75 g*25.4 µ/m²/day.

In another more limited aspect, a printed ink layer is disposed intermediate the skin layer and the energy-cured coating layer.

In another more limited aspect, the heat sealant layer is formed of a polyethylene polymer.

In another more limited aspect, the barrier layer is selected from the group consisting of ethylene-vinyl alcohol (EVOH), polyvinyl alcohol (PVOH), polyamides, polyamide nylon (PA), and polyamide nylon 6 (PA6).

In another more limited aspect, the moisture barrier layer is a high-density polyethylene.

In another limited aspect, the high-density polyethylene has a density in the range of about 0.940 g/cm³ to 0.975 g/cm³.

In another more limited aspect, the energy-cured coating is a cured polyacrylate composition.

In another more limited aspect, the energy-cured coating is an electron beam cured polyacrylate composition.

In another more limited aspect, the energy-cured coating comprises monomers and oligomers induced into UV polymerization and curing through the mediation of photoinitiators and exposure to UV light.

In another more limited aspect, the packaging film has a haze value in the range of 20% to 28%.

In another more limited aspect, the packaging film has a haze value in the range of 21% to 27%.

In another more limited aspect, a melting temperature of the outermost surface of the packaging film is at least 100 degrees Celsius higher than a melting temperature of the innermost layer of the packaging film In another more limited aspect, a melting temperature of the outermost surface of the packaging film is at least 180 degrees Celsius higher than a melting temperature of the innermost layer of the packaging film.

Known films that offer recyclability lack heat resistance, optical clarity, or both. Known films with high optical clarity are polyester based and are non-recyclable. Therefore, an advantage of the preset development is found in that it offers recyclability, high optical clarity, and high heat resistance.

Still further advantages and benefits of the present invention will become apparent to those of ordinary skill in the art upon reading and understanding the following detailed description of the preferred embodiments.

BRIEF DESCRIPTION OF THE DRAWING(S)

The invention may take form in various components and arrangements of components, and in various steps and arrangements of steps. The drawings, which are not to scale, are only for purposes of illustrating preferred embodiments and are not to be construed as limiting the invention.

DETAILED DESCRIPTION OF THE PREFERRED EMBODIMENT(S)

Figure 1:
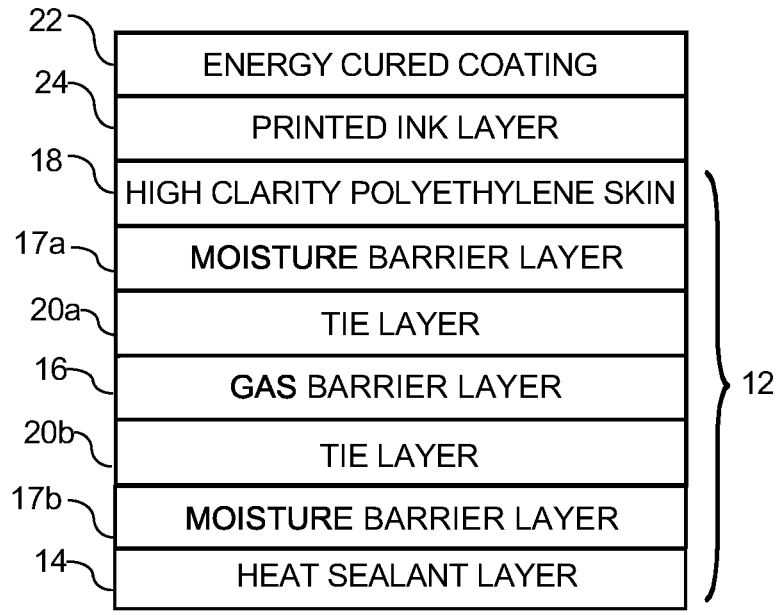
FIG. 1 is a side cross sectional view of an exemplary embodiment packaging film herein.

FIG. 1 shows a preferred embodiment of a packaging film according to the present disclosure, designated generally as 10. It is to be understood that the disclosed embodiment is merely exemplary of the invention, which may be embodied in various forms. Therefore, specific structural and functional details disclosed herein are not to be interpreted as limiting but merely as a basis for the claims and as a representative basis for teaching one skilled in the art to variously employ the present inventive concept in virtually any appropriately detailed structure. Further, the terms and phrases used herein are not intended to be limiting but rather to provide an understandable description of the present development. Although FIG. 1 depicts a schematic illustration of the various layers in the preferred embodiment, it will be understood that FIG. 1 does not necessarily represent the actual or relative thickness of the various layers of the film.

The terms "a" or "an," as used herein, are defined as one or more than one. The term "another," as used herein, is defined as at least a second or more. The terms "including" and/or "having" as used herein, are defined as comprising (i.e., open transition). The term "coupled" or "operatively coupled," as used herein, is defined as indirectly or directly connected.

All numbers herein are assumed to be modified by the term "about," unless stated otherwise. The recitation of numerical ranges by endpoints includes all numbers subsumed within that range (e.g., 1 to 5 includes 1, 1.5, 2, 2.75, 3, 3.80, 4, and 5).

As used herein, the term "polyolefin-based packaging film" refers to a film which contains at least 90% by weight polyolefin polymers and less than 10% by weight other polymer materials. The term "polyolefin polymer" includes polyolefin homopolymers, copolymers, terpolymers or combinations thereof. In certain more limited embodiments, the polyolefin-based packaging films herein contain at least 95% by weight polyolefin polymers and less than 5% by weight other polymer materials.

As used herein, the term "polyethylene-based packaging film" refers to a film which contains at least 90% by weight polyethylene polymers and less than 10% by weight other polymer materials. The term "polyethylene polymer" includes polyethylene homopolymers, copolymers, terpolymers, or combinations thereof. In certain more limited embodiments, the polyethylene-based packaging films herein contain at least 95% by weight polyethylene polymers and less than 5% by weight other polymer materials.

As used herein, the term "polypropylene-based packaging film" refers to a film which contains at least 90% by weight polypropylene polymers and less than 10% by weight other polymer materials. The term "polypropylene polymer" includes polypropylene homopolymers, copolymers, terpolymers, or combinations thereof. In certain more limited embodiments, the polypropylene-based packaging films herein contain at least 95% by weight polypropylene polymers and less than 5% by weight other polymer materials.

Referring now to FIG. 1, a preferred embodiment polyolefin-based packaging film manufactured in accordance with an exemplary embodiment of the present invention comprises a coextruded monoweb 12, which includes a heat sealant layer 14, a gas barrier layer 16, moisture barrier layers 17, and a high optical clarity polyethylene skin 18. In certain embodiments, the polyolefin-based packaging film is a polyethylene-based packaging film. The heat sealant layer 14 is an inner layer and forms the innermost layer of the packaging film 10. The high optical clarity polyethylene skin 18 is an outer layer wherein the outward facing surface thereof defines a printing surface for receiving a printing ink layer.

In certain embodiments, the tie layers 20a, 20b are used in the event that the gas barrier layer 16 and the moisture barrier layers 17a, 17b are incompatible or poorly adhering with each other. In the illustrated embodiment, a first tie layer 20a is interposed between a first moisture barrier layer 17a and the gas barrier layer 16. A second tie layer 20b is interposed between the gas barrier layer 16 and a second moisture barrier layer 17b.

The heat sealant layer 14 may comprise any polyolefin polymer suitable for providing a hermetic seal in a finished packaging article, and preferably has a low seal initiation temperature/melting temperature. Exemplary polyolefin polymers forming the heat sealant layer 14 include, for example, homopolymers, copolymers, and terpolymers of ethylene, high-density polyethylene (HDPE), medium density polyethylene (MDPE), linear medium density polyethylene (LMDPE), low-density polyethylene (LDPE), linear low density polyethylene (LLDPE), very low density polyethylene (VLDPE), metallocene linear low-density polyethylene (mLLDPE), and homopolymers, copolymers, and terpolymers of polypropylene.

The gas barrier layer 16 is a polymer barrier layer which prevents or reduces the transmission of oxygen or other gas molecules through the packaging film. Exemplary gas barrier layers include ethylene-vinyl alcohol (EVOH), polyvinyl alcohol (PVOH), polyamides, e.g., polyamide nylon (PA) (e.g., polyamide nylon 6 (PA6)), with or without compatibilizer additives. The gas barrier layer 16 is formed of a material which has a higher melting point than the sealant layer.

In certain embodiments, the coextruded web 12 has a high level of moisture barrier, i.e., below 15.5 g*25.4 μ/m²/day. In certain preferred embodiments, the moisture barrier (moisture vapor transmission rate (MVTR)) of the coextruded web 12 is between about 1.55 g*25.4 μ/m²/day to 7.75 g*25.4 μ/m2/day. Each moisture barrier layer 17 is a polyethylene layer which prevents or reduces the transmission of moisture vapor through the packaging film. Each moisture barrier layer 17 may be formed of a moisture barrier material, such as high density polyethylene (HDPE), medium density polyethylene (MDPE), low density polyethylene (LDPE), linear polyethylenes such as linear low density polyethylene (LLDPE), and blends thereof. In certain preferred embodiments, the moisture barrier layer is a high density polyethylene with a density range of 0.940 to 0975 g/cm³.

The high optical clarity polyethylene skin layer 18 is formed of a polyethylene polymer having a high optical clarity value or low haze value. In certain embodiments, the high optical clarity polyethylene polymer has a haze value, as determined by ASTM D1003, in the range of 18% to 30%. In certain embodiments, the high optical clarity polyethylene skin layer 18 is formed of one or more grades of polyethylene having a density less than 0.93 g/cm³. In certain embodiments, the high optical clarity polyethylene skin layer 18 is formed of a polyethylene selected from low density polyethylene (LDPE), linear low density polyethylene (LLDPE), metallocene low density polyethylene (mLDPE), and metallocene linear low density polyethylene (mLLDPE).

Haze is a measurement referring to optical clarity or window clarity of a film formed into a package. Haze is the scattering of light as it passes through a transparent material, resulting in poor visibility and/or glare. ASTM D1003 defines haze as that percentage of light which in passing through deviates from the incident beam greater than 2.5 degrees on the average.

In Table 1, below, film variable 1 is a typical PET/PE non-recyclable laminate in the industry that has acceptable window clarity for product viewing. Film variables 2 and 3 are coextruded films used in recyclable packages, which do not exhibit low enough haze values for acceptable product viewing. Film variables 4 and 5 represent coextruded films in accordance with the present disclosure that have an improved haze value. Thus, the films in accordance with the present disclosure provide both an optical clarity comparable to the nonrecyclable PET/PE film structures as well as the recyclability of the recyclable, albeit hazy, polyethylene structures.

TABLE 1

| Film Variable | Thickness (Micron) | Haze (%) per ASTM D1003 |
|---|---|---|
| 1: 48 gauge PET/3.5 mil PE | 101.1 | 28 |
| 2: Recyclable Polyethylene | 88.9 | 53 |
| 3: Recyclable Polyethylene | 88.9 | 46 |
| 4: High Clarity Recyclable Polyethylene | 114.3 | 25 |
| 5: High Clarity Recyclable Polyethylene | 88.9 | 21 |

In certain embodiments, the packaging films herein have a haze value, as determined by ASTM D1003 in the range of from 18% to 30%, preferably from 20% to 28%, and more preferably from 21% to 27%.

The tie layers 20a, 20b may be any suitable tie resin or adhesion promotor as would be known by persons skilled in the art. Exemplary tie layers include maleic anhydride (MAH) tie resins and others.

The coextruded monoweb 12 is formed by coextruding a group of resins in a multi-layer coextruded film process. For example, the resins for the heat sealant layer 14, gas barrier layer 16, moisture barrier layers 17a, 17b, high optical clarity polyethylene skin layer 18, and the tie layers 20a, 20b are fed into respective extruders and melted. The molten resins are then forced through a die to form the coextruded monoweb 12. Coextrusion of the monoweb 12 can be carried out using known methods, preferably using a blown film coextrusion process. However, it is also contemplated that other coextrusion methods could also be used, such as a cast film coextrusion process. The coextruded monoweb 12 so produced is then further subjected to a surface printing process and an energy-cured coating process in additional process steps. It will be recognized that the coextrusion, printing, and energy-cured coating steps may be performed in a continuous process. Alternatively, coextruded monoweb 12 can be formed and wound onto a roll for storage, wherein the application of the printed layer and the application of the energy-cured coating layer are performed in subsequent process steps.

In preferred embodiments, the energy-cured coating 22 is a cured polyacrylate composition formed from by curing a reactive polymer composition comprising one or more monomers, oligomers, polymers, acrylates, polyacrylates, and/or polyacrylate copolymers. In certain embodiments, the energy-cured coating 22 is an electron beam cured composition that includes, but is not limited to, ethoxylated trimethylolpropane triacrylates, acrylated and acrylate ester resins, polyol acrylates, trimethylolpropane triacrylates, polydimethylsiloxane acrylates, and maleic anhydrides. Other energy-cured coating compositions may include monomers and oligomers that contain vinyl and allyl compounds, as well as monomers and oligomers that are induced into UV polymerization and curing through the mediation of photoinitiators and exposure to UV light and coatings that provide enhanced oxygen and/or moisture barrier properties.

In certain embodiments, the energy-cured coating provides the outermost surface of the packaging film with a melting temperature which is at least 100 degrees Celsius higher than the melting temperature of the innermost surface of the packaging film, wherein the "melting temperature" as used herein is the refers to the temperature at which by a heat seal formed a cohesive strength of at least one pound per inch of seal width when subjecting the surfaces to a sealing pressure of 40 pounds per square inch and a sealing dwell time of 0.5 seconds. In certain embodiments, the energy-cured coating provides the outermost surface of the packaging film with a melting temperature which is at least 120 degrees Celsius higher than the melting temperature of the innermost surface of the packaging film. In certain embodiments, the energy-cured coating provides the outermost surface of the packaging film with a melting temperature which is at least 180 degrees Celsius higher than the melting temperature of the innermost surface of the packaging film.

In certain embodiments, the energy-cured coating 22 has a coating thickness in the range of from about 0.78 micron (0.03 mil) to about 8 microns (0.31 mil), preferably from about 2.3 microns (0.091 mil) to about 4.7 micron (0.19 mil). In certain embodiments the energy-cured coating 22 has a density in the range of from about 0.85 g/cc to about 1.25 g/cc, preferably from about 1.02 to about 1.06 g/cc, and most preferably about 1.04 g/cc. In certain embodiments, the energy-cured coating 22 has a coating weight in the range of from about 0.5 lb/ream (0.81 g/m$^2$) to about 5.0 lb/ream (8.14 g/m$^2$), preferably of from about 1.5 lb/ream (2.44 g/m$^2$) to about 3.0 lb/ream (4.88 g/m$^2$). In certain embodiments, the energy-cured coating 22 has a coating weight which is effective to impart a property in the packaging film, including reduced susceptibility to melting, reduced susceptibility to deforming, or both.

The printed ink layer 24 is disposed on the outward facing surface of the high clarity polyethylene skin layer 18. The printing ink layer 24 provides printed indicia intended to appear on a packaging structure formed from the packaging film 10. Because the printing ink layer 24 is applied to the outward facing surface of the high clarity polyethylene skin layer 18, the printed material is effected in a front printed format. The printing ink layer 24 can be applied to the outward facing surface of the high clarity polyethylene skin layer 18 via any conventional printing method as would be understood by persons skilled in the art, including without limitation, using a rotogravure printing apparatus or flexographic printing apparatus.

Figure 2:
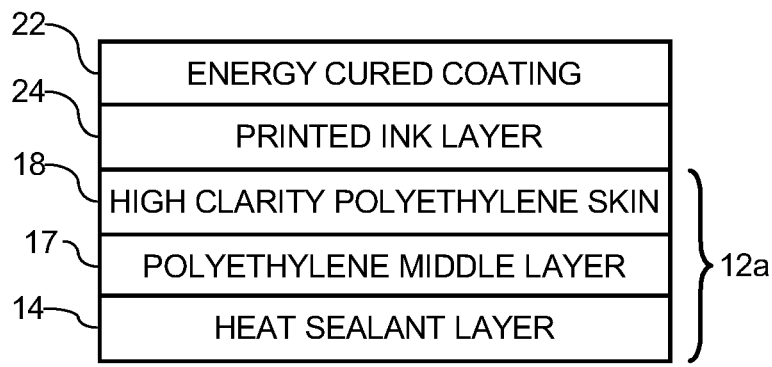
FIG. 2 is a side cross sectional view of a second exemplary embodiment packaging film herein.

Referring now to FIG. 2, there appears second embodiment packaging film 30, which is similar to the packaging film 10 described above, except that a coextruded monoweb 12a is provided which has a polyethylene middle layer 17, comprising a moisture barrier material, such as high density polyethylene (HDPE), medium density polyethylene (MDPE), low density polyethylene (LDPE), linear polyethylenes such as linear low density polyethylene (LLDPE), and blends thereof. In certain preferred embodiments, the moisture barrier layer is a high density polyethylene with a density range of 0.940 to 0975 g/cm$^3$. The moisture barrier layer 17 is formed of a material which has a higher melting point than the sealant layer. In certain embodiments, as the high clarity polyethylene skin layer 18, polyethylene middle layer 17, and heat sealant layer 14 of the coextruded monoweb 12a have good adhesion to each other, tie resin or adhesive layers are not required. Otherwise, the description above with respect to the packaging film 10 appearing in FIG. 1 is equally applicable to the film 30 of FIG. 2.

A film structure in accordance with the present disclosure was tested at a variety of sealing temperatures to determine the difference in melting temperature under between the outermost surface having the energy-cured coating and the innermost surface, namely the sealant layer during a heat sealing process. The heat resistance tests were conducted using a sealing pressure of 40 psi and a sealing dwell time of 0.5 seconds. The sealing temperature ranged from 60 degrees C. to 260 degrees C. The test results show that the sealant layer is fully melted at a sealing temperature between 80 degrees C. and 260 degrees C. under the heat sealing process conditions, while the outer surface having the energy cured coating did not melt at a sealing temperature of 260 degrees C. Data showing the improved heat resistance of an energy-cured coating on a film structure in accordance with the present disclosure is shown in Table 2.

TABLE 2

| Sealing Temperature (° C.) | FILM HEAT RESISTANCE TEST RESULTS<br>Sealing Pressure: 40 psi<br>Sealing Dwell Time: 0.5 seconds<br>Film Thickness: 114.3 micron |
|---|---|
| 60 | Inner surface not melted |
|  | Outer surface not melted |
| 80 | Inner surface initial melt |
|  | Outer surface not melted |
| 130 | Inner surface melted |
|  | Outer surface not melted |
| 135 | Inner surface melted |
|  | Outer surface not melted |
| 140 | Inner surface melted |
|  | Outer surface not melted |
| 260 | Inner surface melted |
|  | Outer surface not melted |

The invention has been described with reference to the preferred embodiment. Modifications and alterations will occur to others upon a reading and understanding of the preceding detailed description. It is intended that the invention be construed as including all such modifications and alterations insofar as they come within the scope of the appended claims or the equivalents thereof

What is claimed is:

1. A recyclable polyethylene-based packaging film, comprising:
   a coextruded web comprising:
      a skin layer comprising an optically transparent polyethylene polymer;
      a heat sealant layer forming an innermost layer of the packaging film, the heat sealant layer comprising a polyethylene polymer;
      a moisture barrier layer disposed intermediate the skin layer and the heat sealant layer; and
   an energy-cured coating disposed on the skin layer of the coextruded web and forming an outermost surface of the packaging film, wherein the energy-cured coating has a coating weight which is effective to impart a property in the packaging film selected from reduced susceptibility to melting, reduced susceptibility to deforming, or both, and
   wherein a melting temperature of the outermost surface of the packaging film is at least 100 degrees Celsius higher than a melting temperature of the innermost layer of the packaging film.

2. The packaging film of claim 1, wherein the packaging film has a haze value in the range of 18% to 30%.

3. The packaging film of claim 1, wherein the packaging film has a moisture vapor transmission rate in the range of about 1.55 g*25.4 μ/m²/day to 7.75 g*25.4 μ/m²/day.

4. The packaging film of claim 1, further comprising a printed ink layer disposed between the skin layer and the energy-cured coating.

5. The packaging film of claim 1, wherein the heat sealant layer is formed of a polyethylene polymer selected from the group consisting of high-density polyethylene (HDPE), medium density polyethylene (MDPE), linear medium density polyethylene (LMDPE), low-density polyethylene (LDPE), linear low density polyethylene (LLDPE), very low density polyethylene (VLDPE), and metallocene linear low-density polyethylene (mLLDPE).

6. The packaging film of claim 1, wherein the moisture barrier layer is a high-density polyethylene.

7. The packaging film of claim 6, wherein the high-density polyethylene has a density in the range of about 0.940 g/cm³ to 0.975 g/cm³.

8. The packaging film of claim 1, wherein the energy-cured coating is a cured polyacrylate composition.

9. The packaging film of claim 1, wherein the energy-cured coating is an electron beam cured polyacrylate composition.

10. The packaging film of claim 1, wherein the energy-cured coating comprises monomers and oligomers induced into UV polymerization and curing through the mediation of photoinitiators and exposure to UV light.

11. The packaging film of claim 1, wherein the packaging film has a haze value in the range of 20% to 28%.

12. The packaging film of claim 1, wherein the packaging film has a haze value in the range of 21% to 27%.

13. The packaging film of claim 1, wherein a melting temperature of the outermost surface of the packaging film is at least 180 degrees Celsius higher than a melting temperature of the innermost layer of the packaging film.

14. A recyclable polyethylene-based packaging film, comprising:
 a coextruded web comprising:
  a skin layer comprising an optically transparent polyethylene polymer;
  a heat sealant layer forming an innermost layer of the packaging film, the heat sealant layer comprising a polyethylene polyolefin polymer;
  a gas barrier layer disposed intermediate the skin layer and the heat sealant layer;
  a first moisture barrier layer interposed between the skin layer and the gas barrier layer; and
  a second moisture barrier layer interposed between the gas barrier layer and the heat sealant layer; and
 an energy-cured coating disposed on the skin layer of the coextruded web and forming an outermost surface of the packaging film, wherein the energy-cured coating has a coating weight which is effective to impart a property in the packaging film selected from reduced susceptibility to melting, reduced susceptibility to deforming, or both; and wherein a melting temperature of the outermost surface of the packaging film is at least 100 degrees Celsius higher than a melting temperature of the innermost layer of the packaging film.

15. The packaging film of claim 14, further comprising one or both of:
 a first tie layer disposed between the gas barrier layer and the first moisture barrier layer; and
 a second tie layer disposed between the gas barrier layer and the second moisture barrier layer;
 wherein the first tie layer and the second tie layer may be the same or different.

16. The packaging film of claim 14, wherein the packaging film has a haze value in the range of 18% to 30%.

17. The packaging film of claim 14, wherein the packaging film has a moisture vapor transmission rate in the range of about 1.55 g*25.4 μ/m²/day to 7.75 g*25.4 μ/m²/day.

18. The packaging film of claim 14, further comprising a printed ink layer disposed between the skin layer and the energy-cured coating.

19. The packaging film of claim 14, wherein the heat sealant layer is formed of a polyethylene polymer selected from the group consisting of high-density polyethylene (HDPE), medium density polyethylene (MDPE), linear medium density polyethylene (LMDPE), low-density polyethylene (LDPE), linear low density polyethylene (LLDPE), very low density polyethylene (VLDPE), and metallocene linear low-density polyethylene (mLLDPE).

20. The packaging film of claim 14, wherein the gas barrier layer is selected from the group consisting of ethylene-vinyl alcohol (EVOH), polyvinyl alcohol (PVOH), polyamides, polyamide nylon (PA), and polyamide nylon 6 (PA6).

21. The packaging film of claim 14, wherein each of the first moisture barrier layer and the second moisture barrier layer is a high-density polyethylene.

22. The packaging film of claim 21, wherein the high-density polyethylene has a density in the range of about 0.940 g/cm³ to 0.975 g/cm³.

23. The packaging film of claim 14, wherein the energy-cured coating is a cured polyacrylate composition.

24. The packaging film of claim 14, wherein the energy-cured coating is an electron beam cured polyacrylate composition.

25. The packaging film of claim 14, wherein the energy-cured coating comprises monomers and oligomers induced into UV polymerization and curing through the mediation of photoinitiators and exposure to UV light.

26. The packaging film of claim 14, wherein the packaging film has a haze value in the range of 20% to 28%.

27. The packaging film of claim 14, wherein the packaging film has a haze value in the range of 21% to 27%.

28. The packaging film of claim 14, wherein a melting temperature of the outermost surface of the packaging film is at least 180 degrees Celsius higher than a melting temperature of the innermost layer of the packaging film.

* * * * *